2,705,733
Patented Apr. 5, 1955

2,705,733

PURIFICATION OF CRUDE BENZENE

Helmut Nonnenmacher, Mannheim, and Wilhelm von Fuener, Ludwigshafen (Rhine), Germany, assignors to Badische Anilin- & Soda-Fabrik Aktiengesellschaft, Ludwigshafen (Rhine), Germany No Drawing. Application May 1, 1951,
Serial No. 224,077

Claims priority, application Germany May 20, 1950

13 Claims. (Cl. 260—674)

This invention relates to a new and improved method of purifying crude benzene.

A standard method of purifying crude benzene comprises treating the benzene at high temperature and under pressure in the presence of catalysts insensitive to sulfur with hydrogen in such a manner that the benzene or any benzene homologues present undergo no or only a negligible change. The catalysts hitherto used in practice for this process consisted wholly or to a large extent of the oxides or sulfides of the metals of the 6th group of the periodic system, in particular of molybdenum, chromium and tungsten. The said expensive, highly active metal compounds, when used in comparatively small amounts on carriers, however failed to prove successful in the prior art practice for the reason that this type catalysts becomes inactive after only a short time and moreover has but a poor catalytic action.

We have now found that an active alumina prepared in a particular manner, i. e. an alumina obtained from aluminum salt solutions by precipitation at high temperatures and at a pH value of between about 7 and about 10 and subsequent heating, can efficiently be used as a carrier giving long-service catalysts of high activity. The oxides or sulfides of the metals of the 6th group, of the periodic system, in particular of the left side thereof, as for example of molybdenum, chromium or tungsten, are applied to these carriers in an amount of from 5 to 25%, in particular 8 to 15%. It is of advantage also to provide the said active alumina with oxides or sulfides of metals of the 8th group, in particular of nickel or cobalt. The proportion of the 8th group component should be lower than that of the 6th group component. In the usual case the ratio of the amounts of the metal compounds of the 6th group to those of the 8th group in the ready-for-use catalyst should be from 10:8 to 10:1, more particularly 10:5 to 10:1.

The initial materials contemplated for treatment by the method according to this invention are crude benzenes, benzenes of middle boiling range and heavy benzenes. The catalyst is especially efficient for benzenes which have been produced at high temperature.

The refining hydrogenation generally proceeds at temperatures of from about 200° to 450° C. in the presence of flowing hydrogen in an amount of from 0.5 to 10 cubic metres per kilogram of crude benzene and under a pressure of 100 to about 300 atmospheres. The catalyst also allows of refining the benzene at pressures lower than 100 atmospheres. Consequently, pressures of, say, about 20 to 80 atmospheres can be used. At these pressures it is necessary, however, to regenerate the catalyst from time to time by burning off the carbonaceous substances deposited thereon. The activity of the catalyst, however, continues so that it can be used for several weeks, up to 1 to 2 months, without needing regeneration. At higher pressures, as for example above 100 atmospheres, the catalyst is stable for a long time, for example one or more years. The hydrogenating gas may be pure hydrogen or gases containing hydrogen, such as coke-oven gas, watergas, illuminating gas, town gas or other industrial gases.

The throughput and the reaction conditions (temperature, pressure and amount of hydrogen) are so correlated that the boiling range of the initial material is not modified in a substantial degree. In a preferred embodiment of our invention the reaction is carried out with increasing temperatures. For this purpose the catalyst layer may be feasibly subdivided into two parts, a temperature of 180° to 250° C. prevailing in the part through which the initial material flows first and a temperature of 300° to 450° C. in the part through which it flows subsequently. It is advantageous to use an active alumina which contains both oxides and sulfides of the metals of the 6th and 8th groups at the lower temperature.

The active alumina is prepared as follows:

Alumina hydrate is precipitated from an aluminum salt solution at temperatures above 40° C., advantageously above 50° C., for example 60° to 70° C., while maintaining a pH value between about 7 and about 10 and the precipitate is stripped off and heated. An especially active alumina is obtained by carrying out the precipitation at a temperature above 80° C. Instead of heating during the precipitation, there may also be heated after the precipitation, but before separating the water off the precipitate. An essential feature of this technique is to maintain temperatures above 80° C., for example of 85° to 100° C., during the precipitation.

The precipitate is stripped off the liquid desirably while this is still hot, in any case at temperatures not below about 40° to 50° C., and then washed out. Unlike alumina hydrate precipitates which have been precipitated in standard fashion at low temperatures, the precipitate obtained by our process can readily be washed free from salts with hot water in a relatively short time.

The alumina hydrate thus prepared can, after drying, preferably, at 100° to 150° C., be conveniently made into shapes by pressing. By heating to more than 300° C., in particular 300° to 600° C., there are then obtained solid shapes of active alumina which differs from active alumina produced by other methods in its exceptionally great hardness.

The alumina carrier prepared in the said manner has a high absorption power, very low piled weight, a long life in service at high temperatures and, in combination with the said heavy metal compounds listed above, a particularly great catalytic activity although the said high-quality compounds are present in smaller amounts than in the known catalysts above described.

The following example will further illustrate this invention but the invention is not restricted to this example.

*Example*

An aluminum nitrate solution (having an $Al_2O_3$-content of 8%) and a 15% ammonia solution are poured simultaneously into a vessel heated to 95° C. so that the mixture of the solutions in the vessel has a pH value of 7. The solution and the precipitate formed are passed, while still hot, to a filter press and the filter cake is washed for 3 to 4 hours with water at 70° to 80° C. The alumina hydrate thus obtained is dried, comminuted, shaped into pills and then heated to 300° to 350° C. The mass has a piled weight of 0.35 to 0.40 kilogram per liter.

The shaped alumina is soaked with a solution of ammonium molybdate, dried and heated to 400° to 450° C. The catalyst then consists of active alumina with 10% of molybdic acid.

Two consecutive reaction vessels are filled with this shaped catalyst.

A mixture of crude and heavy benzene containing 15% of components boiling above 200° C. is heated together with 2 cubic meters of hydrogen under a pressure of 120 atmospheres to 230° C. and led at this temperature through the first reaction vessel. The reaction products then pass through a preheater into the second reaction vessel in which a temperature of 400° C. is maintained. The products are passed through the second reaction vessel at a rate of 1 kilogram per litre of catalyst volume per hour.

By working in this way the aromatic hydrocarbons are not hydrogenated. The boiling curve remains unchanged and there is obtained a practically completely refined product from which the aromatic hydrocarbons can be obtained in a 100% yield by distillation.

The catalyst retains its full activity for at least a year at this pressure.

What we claim is:

1. A process for the purification of crude benzene without substantially changing the benzene which comprises subjecting said benzene to a temperature between about 180° C. and about 450° C. in the presence of hydrogen containing gases under a pressure between about 20 and about 300 atmospheres and in the presence of a catalyst of the sulfur-insensitive type comprising an active alumina catalyst which contains a compound selected from the group consisting of oxides and sulfides of metals of the left side of the 6th group of the periodic system and also contains a compound selected from the group consisting of oxides and sulfides of metals of the 8th group of the periodic system, which catalyst has been prepared by a process which comprises precipitating alumina hydrate from an aluminum salt solution having a pH of between 7 and about 10, heating the precipitate containing liquid to a temperature of 80° C. to 100° C. prior to separating the precipitate, separating the precipitate from the liquid while still hot, washing the separated precipitate, heating the precipitate to 300° C. to 600° C., and then applying said compounds to the alumina thus obtained.

2. A process as defined in claim 1 wherein the metal compounds are employed in proportions such that the 6th group metal compound is present in the catalyst product in greater proportion than is the 8th group metal compound.

3. A process as defined in claim 1 wherein the metal compounds are employed in proportions such that the 6th group metal compound and the 8th group metal compound are present in the catalyst product in a ratio of from 10:8 to 10:1.

4. A process for the purification of crude benzene without substantially changing the benzene which comprises subjecting said benzene to a temperature between about 180° C. and about 450° C. in the presence of hydrogen containing gases under a pressure between about 20 and about 300 atmospheres and in the presence of a catalyst of the sulfur-insensitive type comprising an active alumina catalyst containing an oxide of molybdenum applied thereto, which catalyst has been prepared by a process which comprises precipitating alumina hydrate from an aluminum salt solution with aqueous ammonia at pH 7 and at a temperature of about 95° C., separating the precipitate from the liquid while still hot, washing the precipitate with water at about 70° C. to 80° C., drying the alumina hydrate thus obtained, shaping the dried hydrate into pills, heating the pills to 300° C. to 600° C., and then applying the oxide of molybdenum to said pills.

5. A process for the purification of crude benzene without substantially changing the benzene which comprises subjecting said benzene to a temperature between about 180° C. and about 450° C. in the presence of hydrogen containing gases under a pressure between about 20 and about 300 atmospheres and in the presence of a catalyst of the sulfur-insensitive type comprising an active alumina catalyst containing an oxide of molybdenum, which catalyst has been prepared by a process which comprises precipitating alumina hydrate from an aluminum salt solution having a pH of 7 to 10 and at a temperature of 80° C. to 100° C., separating the precipitate from the liquid while still hot, washing with hot water and drying the separated precipitate, shaping the dried precipitate into pills, heating the pills to 300° C. to 600° C., and then applying the oxide of molybdenum to said pills.

6. The process according to claim 5 in which the oxide of molybdenum is present in an amount between 5% and 25% based on the amount of alumina.

7. The process according to claim 5 in which the crude benzene is subjected to a two-stage heating, the first stage being maintained at a temperature between about 180° C. and 250° C. and the second stage being maintained at a temperature between about 300° C. and 450° C.

8. A process for the purification of crude benzene without substantially changing the benzene which comprises subjecting said benzene to a temperature between about 180° C. and about 450° C. in the presence of hydrogen containing gases under a pressure between about 20 and about 300 atmospheres and in the presence of a catalyst of the sulfur-insensitive type comprising an active alumina catalyst containing a sulfide of molybdenum applied thereto, which catalyst has been prepared by a process which comprises precipitating alumina hydrate from an aluminum salt solution having a pH of 7 to 10 and at a temperature of 80° C. to 100° C., separating the precipitate from the liquid while still hot, washing with hot water and drying the separated precipitate, shaping the dried precipitate into pills, heating the pills to 300° C. to 600° C., and then applying said sulfide of molybdenum to the pills.

9. A process for the purification of crude benzene without substantially changing the benzene which comprises subjecting said benzene to a temperature between about 180° C. and about 450° C. in the presence of hydrogen containing gases under a pressure between about 20 and about 300 atmospheres and in the presence of a catalyst of the sulfur-insensitive type comprising an active alumina catalyst containing an oxide of tungsten, which catalyst has been prepared by a process which comprises precipitating alumina hydrate from an aluminum salt solution having a pH of 7 to 10 and at a temperature of 80° C. to 100° C., separating the precipitate from the liquid while still hot, washing with hot water and drying the separated precipitate, shaping the dried precipitate into pills, heating the pills to 300° C. to 600° C., and then applying said oxide of tungsten to the pills.

10. A process for the purification of crude benzene without substantially changing the benzene which comprises subjecting said benzene to a temperature between about 180° C. and about 450° C. in the presence of hydrogen containing gases under a pressure between about 20 and about 300 atmospheres and in the presence of a catalyst of the sulfur-insensitive type comprising an active alumina catalyst containing a sulfide of tungsten, which catalyst has been prepared by a process which comprises precipitating alumina hydrate from an aluminum salt solution having a pH of 7 to 10 and at a temperature of 80° C. to 100° C., separating the precipitate from the liquid while still hot, washing with hot water and drying the separated precipitate, shaping the dried precipitate into pills, heating the pills to 300° C. to 600° C., and then applying said sulfide of tungsten to the pills.

11. The process according to claim 8 in which said sulfide of molybdenum is present in an amount between 5% and 25% based on the amount of the alumina.

12. The process according to claim 9 in which said oxide of tungsten is present in an amount between 5% and 25% based on the amount of the alumina.

13. The process according to claim 10 in which said sulfide of tungsten is present in an amount between 5% and 25% based on the amount of the alumina.

References Cited in the file of this patent

UNITED STATES PATENTS

| Number | Name | Date |
|---|---|---|
| 1,932,365 | Krauch et al. | Oct. 24, 1933 |
| 2,380,279 | Welty | July 10, 1945 |
| 2,393,288 | Byrns | Jan. 22, 1946 |
| 2,394,751 | Cole | Feb. 12, 1946 |
| 2,412,600 | Burk et al. | Dec. 17, 1946 |
| 2,432,286 | Claussen et al. | Dec. 9, 1947 |
| 2,455,634 | Wilson et al. | Dec. 7, 1948 |
| 2,463,072 | Webb et al. | Mar. 1, 1949 |
| 2,499,255 | Parker | Feb. 28, 1951 |